US012659683B2

(12) United States Patent
De Bruijn et al.

(10) Patent No.: US 12,659,683 B2
(45) Date of Patent: Jun. 16, 2026

(54) REPRESENTATION AND RENDERING OF AUDIO OBJECTS

(71) Applicant: Telefonaktiebolaget LM Ericsson (publ), Stockholm (SE)

(72) Inventors: Werner De Bruijn, Stockholm (SE); Tommy Falk, Spånga (SE); Tomas Jansson Toftgård, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 321 days.

(21) Appl. No.: 17/910,247

(22) PCT Filed: Mar. 10, 2020

(86) PCT No.: PCT/EP2020/056349
§ 371 (c)(1),
(2) Date: Sep. 8, 2022

(87) PCT Pub. No.: WO2021/180310
PCT Pub. Date: Sep. 16, 2021

(65) Prior Publication Data

US 2023/0088922 A1 Mar. 23, 2023

(51) Int. Cl.
*H04S 7/00* (2006.01)

(52) U.S. Cl.
CPC ............. *H04S 7/30* (2013.01); *H04S 2400/11* (2013.01)

(58) Field of Classification Search
CPC .......... H04S 7/30; H04S 2400/11; H04S 3/00; H04S 3/002; H04S 3/004; H04S 3/006; H04S 3/008; H04S 3/02
USPC ............................................ 381/300, 22, 23
See application file for complete search history.

(56) References Cited

U.S. PATENT DOCUMENTS

| | | | | |
|---|---|---|---|---|
| 9,749,738 | B1 * | 8/2017 | Adsumilli | H04R 3/005 |
| 9,805,725 | B2 | 10/2017 | Crockett et al. | |
| 9,961,475 | B2 | 5/2018 | Kim et al. | |
| 2015/0332680 | A1 * | 11/2015 | Crockett | G10L 19/20 381/23 |
| 2019/0253821 | A1 * | 8/2019 | Buchner | H04R 3/02 |
| 2020/0068333 | A1 | 2/2020 | Miyasaka | |

OTHER PUBLICATIONS

Miyabe, S. et al., "Temporal Quantization of Spatial Information Using Directional Clustering for Multichannel Audio Coding", 2009 IEEE Workshop on Applications of Signal Processing to Audio and Acoustics, Oct. 18-21, 2009, New Paltz, NY (4 pages).

(Continued)

*Primary Examiner* — Vivian C Chin
*Assistant Examiner* — Douglas J Suthers
(74) *Attorney, Agent, or Firm* — Rothwell, Figg, Ernst & Manbeck, P.C.

(57) ABSTRACT

A method (900) for representing a cluster of audio objects (202). The method includes obtaining (s902) reference position information identifying a reference position within the cluster of audio objects; and using the obtained reference position information, transforming (s904) the cluster of audio objects into a composite spatial audio object. The transforming of the cluster of audio objects into the composite spatial audio object is performed independently of any listening position of any user.

21 Claims, 10 Drawing Sheets

(56) References Cited

OTHER PUBLICATIONS

Poletti, M.A., "Three-Dimensional Surround Sound Systems Based on Spherical Harmonics", J. Audio Eng. Soc., vol. 53, No. 11, Nov. 2005 (22 pages).
Daniel, J. et al., "Further Investigations of High Order Ambisonics and Wavefield Synthesis for Holophonic Sound Imaging", Audio Engineering Society Convention Paper 5788 Presented at the 114th Convention, Mar. 22-25, 2003, Amsterdam, the Netherlands (18 pages).
Meyer, J. et al., "A Highly Scalable Spherical Microphone Array Based on an Orthonormal Decomposition of the Soundfield", mh acoustics, USA, IEEE, 2002, 1781-1784 (4 pages).
International Search Report and Written Opinion dated Dec. 2, 2020 in International Application No. PCT/EP2020/056349 (10 pages).

* cited by examiner

REPRESENTATION AND RENDERING OF AUDIO OBJECTS

CROSS REFERENCE TO RELATED APPLICATIONS

This application is a 35 U.S.C. § 371 National Stage of International Patent Application No. PCT/EP2020/056349, filed Mar. 10, 2020.

TECHNICAL FIELD

Disclosed are embodiments related to the representation and rendering of audio objects.

BACKGROUND

In recent years, object-based representation and rendering of spatial audio scenes has become a common feature of immersive audio systems, formats, and standards. In an object-based audio representation, at least a part of an audio scene is represented by one or more individual audio objects, each positioned at a specified location in a space. Each individual audio object is typically represented as a mono audio signal with associated positional (and often additional types of) metadata.

In extended reality (XR) (e.g., virtual reality (VR), augmented reality (AR), and mixed reality (MR)) applications, object-based audio scenes are typically rendered to users through headphones using a binaural rendering processing.

In the most straightforward object-based rendering scenario, an audio scene is rendered to a user by binaurally rendering each individual audio object separately. This involves convolving each of the individual audio object signals with a suitable pair of Head Related Transfer Function (HRTF) filters corresponding to a direction of each individual audio object relative to the user. Thus, if the audio scene consists of N audio objects, 2×N convolutions must be carried out in real-time to produce the audio scene. For an audio scene containing many audio objects, this will result in a significant computational load at the renderer of the audio scene and increased number of audio signals that need to be transmitted.

Additionally, if the positions of the audio objects in the audio scene change dynamically, it may also be necessary to do real-time interpolation between the HRTF filters to obtain suitable filters for updated positions of the audio objects. The real-time interpolation may also be necessary when the user rotates their head such that the positions of the audio objects change with respect to the user. In this scenario, tracking of the head orientation is needed to affect the audio rendering.

Thus, a direct binaural rendering of each individual audio object included in an object-based scene may require excessive computational power, especially in use cases that involve real-time rendering of scenes containing many audio objects. Various solutions have been developed for reducing the complexity of rendering object-based audio scenes containing many objects.

One way of limiting computational load is to set a limit on the maximum number of audio objects that can be simultaneously active in the scene. For example, for several levels of complexity, an audio profile (e.g., MPEG-H 3D Audio Low Complexity profile) may specify the maximum number of audio objects that may be present in a conformant content stream at any time.

Another way of handling the rendering complexity problem is to use an indirect binaural rendering of the audio objects. In the indirect binaural rendering, an intermediate pre-rendering step is carried out before the actual binaural rendering. For example, in the MPEG-H 3D Audio renderer, all audio objects are first pre-rendered to a static, pre-defined virtual loudspeaker configuration, and, after the first pre-rendering, the resulting virtual loudspeaker signals are binaurally rendered to the user. In the indirect binaural rendering method, instead of binaurally rendering N objects directly, the N objects are first rendered onto M virtual loudspeakers, and then the M virtual loudspeakers are binaurally rendered to the user. When M is less than N, the indirect binaural rendering method results in reduced rendering complexity, neglecting the complexity of the pre-rendering step which is typically smaller than the complexity of the binaural rendering.

In a variation of the indirect binaural rendering method, a pre-rendering of individual objects to a higher order ambisonics (HOA) representation centered around a listening position of a user may be performed, and, after the pre-rendering of the individual audio objects, the intermediate HOA representation is binaurally rendered to the user. Examples of such pre-rendering are described in U.S. Pat. No. 9,961,475.

Another way of reducing the complexity of rendering multiple audio objects is employing some form of clustering to reduce the number of audio objects to be rendered. For example, some clustering algorithm may be used to assign all or some of individual audio objects to one or more groups (i.e., clusters) based on certain criteria (e.g., a spatial proximity of individual objects to each other). The audio signals corresponding to the audio objects that are in the same group (cluster) are combined into a cluster object signal and are binaurally rendered to the user, together with the audio signals corresponding to non-grouped individual objects. The clustering may result in that a total number of cluster objects and non-clustered individual audio objects is smaller than an original number of non-clustered individual audio objects. This results in a reduced rendering complexity, neglecting the complexity of the clustering and combining the signals, which are typically small compared to the complexity of the binaural rendering.

Some clustering methods only combine objects that are within a given spatial proximity of each other ("connectivity-based clustering"), for example, as described in reference [2]. In these clustering methods, the minimum distance between resulting clusters is defined, but the resulting number of clusters depends on the spatial distribution of the individual objects in the scene and may therefore change over time in an uncontrolled way.

Other clustering methods combine all individual audio objects into a given smaller number of clusters ("k-means clustering"), for example, as described in S. Miyabe, K. Masatoki, H. Saruwatari, K. Shikano, T. Nomura, "Temporal Quantization of Spatial Information Using Directional Clustering for Multichannel Audio Coding," IEEE, October 2009. Available DOI: 10.1109/ASPAA.2009.5346519. In these methods, the number of resulting clusters is defined, but the minimum distance between the resulting clusters depends on static or dynamic spatial distribution of the individual audio objects included in a scene.

In some clustering methods, additional perceptual properties are considered in the clustering process. For example, individual audio objects that are considered perceptually insignificant at actual or assumed listening position may be left out given the total context of the audio scene comprising the individual audio objects (e.g., positions, levels, and spectral characteristics of other audio objects).

For example, U.S. Pat. No. 9,805,725 describes a system in which, in a first step, an object-based audio scene is analyzed by determining a perceptual threshold for changing each object's position in relation to an actual or assumed listening position. In a second step, objects which are determined to be located within the same perceptual spatial region from the analysis are assigned to common clusters. For each cluster, a perceptually dominant object or perceptual centroid position is determined based on perceptual aspects such as partial loudness of individual audio objects in relation to actual or assumed listening position. In a third step, all individual audio objects included in the audio scene are assigned to one or more of the identified clusters. In the final rendering step, each resulting cluster is treated and rendered as a conventional point-like audio object positioned at the location of the identified perceptually dominant source or perceptual centroid of the cluster. The cluster object's signal is a mixture of the signals of the individual audio objects assigned to the cluster object. Optionally, individual audio objects may also be merged with fixed "channel bed" audio channels (i.e., audio channels corresponding to a fixed multichannel loudspeaker layout).

SUMMARY

As described above, there are several solutions that aim to reduce the complexity of representing and rendering an object-based audio scene containing many audio objects. These solutions, however, have significant disadvantages.

Setting a Hard Restriction on the Number of Audio Objects

Reducing the representation and rendering complexity by setting a hard restriction on the maximum number of objects that can be simultaneously presented in an audio scene limits creative freedom of content creators and requires the content creators to manage the number of audio objects they use at any given time. This limiting method may be useful for setting a fixed upper limit on the number of audio objects simultaneously contained in an audio scene, which a system can accept in a certain decoder configuration (e.g., like the way used in MPEG-H), but it is a poor solution for flexible (and possibly dynamic) management of the complexity of representing or rendering audio objects.

Indirect Rendering

An indirect rendering of audio objects by first carrying out an intermediate pre-rendering of the audio objects to a pre-defined, static intermediate format may not necessarily reduce the complexity of rendering audio objects. For example, the MPEG-H standard decoder uses a pre-rendering to a pre-defined virtual loudspeaker configuration with a given number of loudspeakers. In such case, the rendering complexity for an object-based scene is reduced only if the number of audio objects present in the scene is greater than the number of loudspeakers in a virtual loudspeaker configuration. If the number of audio objects present in the scene is less than the number of loudspeakers, then the resulting rendering complexity will be higher as compared to when the individual audio objects are rendered directly. Indeed, the main reason for providing a pre-rendering step in MPEG-H is to achieve a uniformity of final rendering processing in a system that was designed to support content containing combinations of different input formats (e.g., channels, discrete and jointly-coded objects, HOA, etc.).

Another disadvantage of the indirect rendering is that the intermediate step of pre-rendering to a static, pre-defined virtual loudspeaker configuration essentially transforms the original source-centric object-based audio scene into a listener-centric (or "sweet spot") representation. One problem with this transformation is that, in the pre-rendering process, the spatial information of the pre-rendered objects is "frozen" into the resulting virtual loudspeaker signals in a way that it is valid only for the specific listening position at the sweet spot of the virtual loudspeaker configuration. In other words, with this type of solution one of the main disadvantages of an object-based representation, namely the fact that the representation is independent of any (actual or assumed) listening position or rendering configuration, is lost. Thus, when either the user or any of the audio objects move within the scene, the pre-rendering of the objects onto the virtual loudspeaker configuration becomes incorrect, and therefore the pre-rendering needs to be re-done (in real-time) every time such change occurs.

Also, in a multi-user situation where multiple users are experiencing the same virtual scene simultaneously from different virtual observation points, an individual pre-rendering needs to be done for each user to ensure that each user receives a spatial rendering of the scene that is correct for each user's own listening position. Furthermore, in case users need to interact with each other and/or the scene as if they are all present in the scene together, pre-renderings for each user should also be spatially consistent with pre-renderings of other users.

Clustering

As described above, employing clustering can reduce the number of audio objects to be rendered because individual audio objects are grouped together to form a cluster object. These cluster objects are essentially traditional point-like mono objects. The audio signal corresponding to each cluster object is a combination (e.g., a summation) of the signals of the individual audio objects included in the cluster. Likewise, the spatial position of the cluster object is a combination of the spatial positions of the individual audio objects (e.g., an average position).

One disadvantage of the conventional clustering method is that once individual audio objects are clustered, the spatial information of the individual audio objects is lost and the loss of the spatial information may lead to a degradation of the perceived spatial quality of a rendered scene.

In the clustering method described in the article—Using directional clustering for multichannel audio coding, 2009 IEEE Workshop on Applications of Signal Processing to Audio and Acoustics—, perceptual analysis and clustering are done with respect to an assumed listening position at the center ("sweet spot") of a pre-defined virtual loudspeaker configuration. Non-grouped audio objects (i.e., the objects that are not clustered) may be merged with fixed channel beds corresponding to the pre-defined loudspeaker configuration.

Using the clustering technique to reduce the rendering complexity is similar to the pre-rendering technique—pre-rendering to a static, pre-defined configuration of virtual loud speakers. Using the clustering technique provides the specific property that the virtual loudspeakers coincide with notational positions of cluster objects (and/or the pre-defined loudspeaker positions associated with the channel beds, for example, as described in the article—Using directional clustering for multichannel audio coding, 2009 IEEE Workshop on Applications of Signal Processing to Audio and Acoustics).

Therefore, the clustering technique has some of the same disadvantages of the pre-rendering technique. In the above described clustering technique, listening position-independent object representation is transformed into a listener-centric sweet-spot representation where the spatial information of the individual objects is "frozen" into the mono cluster object signals, with the consequence that the clustering needs to be re-done every time the user position or object positions change (and, in a multi-listener scenario, the clustering needs to be done for each individual listener).

This disclosure provides a solution that reduces rendering and/or transmission complexity of object-based audio scenes without the above noted disadvantages.

In some embodiments, an efficient method for representing and rendering object-based audio scenes containing many audio objects is provided. The method preserves the essence of spatial information of the original object-based scene and allows the spatial information to be essentially independent of any (actual or assumed) listening position.

In some embodiments, a cluster of audio objects included in an object-based audio scene is selected and transformed into a composite spatial audio object, where the transformation is performed with respect to a reference position within the cluster of audio objects. The composite spatial audio object is then rendered to a user as a spatial representation of the cluster of selected audio objects. In this way, the composite spatial audio object is independent of any actual or assumed listening position.

According to some embodiments, there is provided a method for representing a cluster of audio objects. The method comprises obtaining reference position information identifying a reference position within the cluster of audio objects and transforming the cluster of audio objects into a composite spatial audio object using the obtained reference position information. The transforming of the cluster of audio objects into the composite spatial audio object is performed independently of any listening position of any user.

In some embodiments the apparatus comprises a computer readable storage medium; and processing circuitry coupled to the computer readable storage medium, wherein the processing circuitry is configured to cause the apparatus to perform the methods described herein.

Compared to related arts that (binaurally) render each audio object individually, some embodiments of this disclosure provide a highly reduced rendering complexity, especially in scenes with many audio objects. Also, in those embodiments in which the transformation step is carried out at an encoder side, the amount of audio data to be transmitted to a decoder side can be highly reduced (i.e., a lower-complexity scene representation can be achieved). Furthermore, compared to related arts that use clustering of objects and/or a listener-centric pre-rendering of objects to obtain a simplified scene representation, embodiments of this disclosure provides an advantage of preserving more spatial information of an original object-based scene by transforming clusters of audio objects into spatial audio objects (as opposed to mono cluster objects and/or static pre-defined channel beds).

The embodiments also provide advantages of maintaining source-centric (i.e., object-like) properties of an original object-based representation of a scene by performing a spatial transformation of a cluster of objects with respect to a reference position within the cluster as opposed to performing the spatial transformation with respect to a specific (actual or assumed) listener position, and thus keeping the representation essentially independent of any specific (actual or assumed) listening position. Keeping the representation essentially independent of any specific listening position enables a more efficient rendering adaptation when the user and/or the objects move within the scene. Also, keeping the representation essentially independent of any specific listening position enables an extra degree of artistic control in the rendering (e.g., applying rotation, translation or spatial widening techniques to composite spatial audio objects that represent clusters of audio objects). Furthermore, by keeping the representation essentially independent of any specific listening position, more efficient rendering in multi-user scenarios is enabled.

BRIEF DESCRIPTION OF THE DRAWINGS

The accompanying drawings, which are incorporated herein and form part of the specification, illustrate various embodiments.

DETAILED DESCRIPTION

Figure 1:
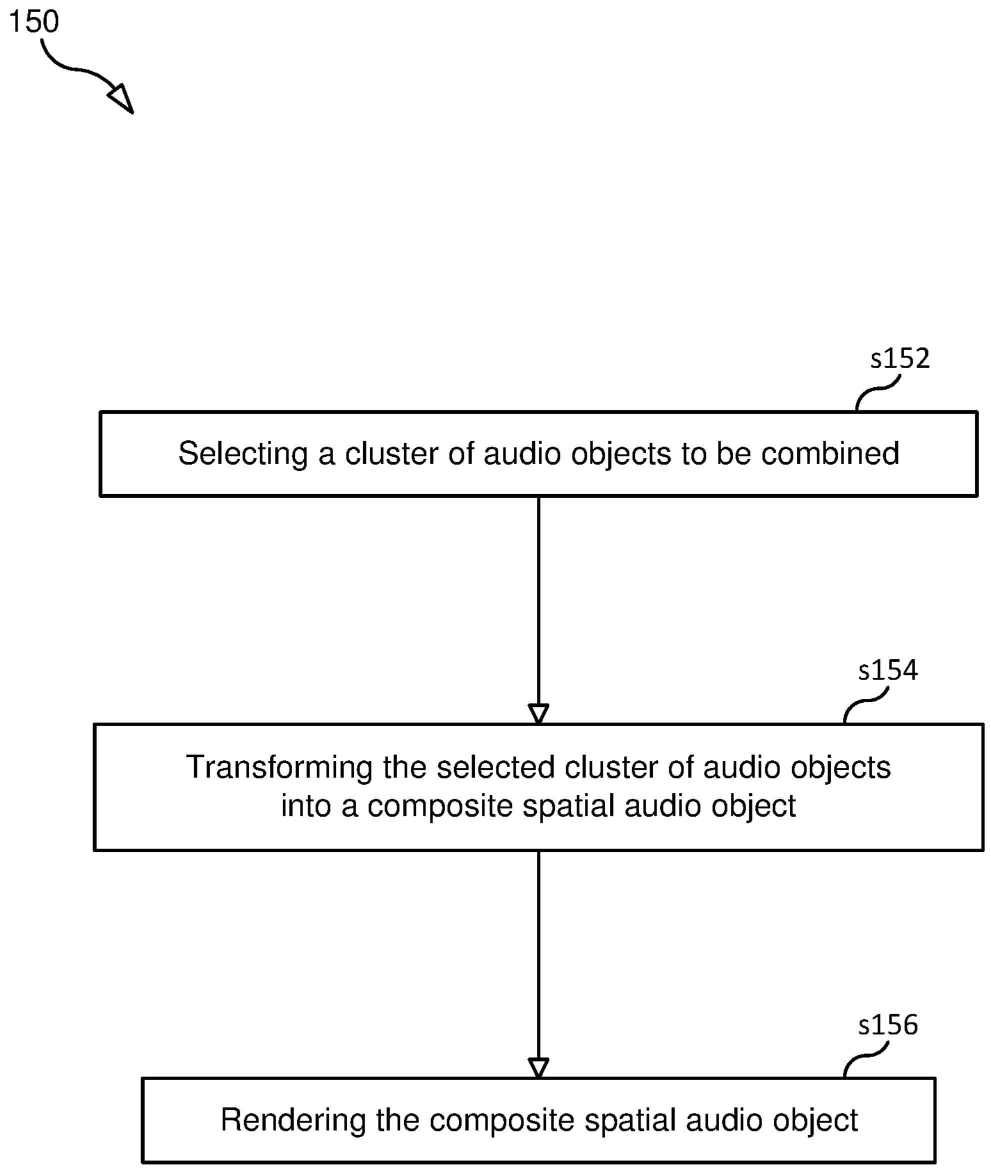
FIG. 1 is a process of representing and rendering multiple audio objects according to some embodiments.

FIG. 1 shows a process 150 of representing and rendering multiple audio objects, according to some embodiments. The method may begin with step s152.

Step s152 comprises forming a cluster of audio objects—i.e., selecting audio objects to be grouped together.

After forming the cluster of audio objects, in step s154, the cluster of audio objects is transformed into a composite spatial audio object representing the cluster of audio objects while preserving relative spatial positional information of the audio objects included in the cluster. The transformation is performed with respect to a reference position within the cluster of audio objects. Advantageously, in this way, the transformation is independent of any listening position.

After transforming the cluster of audio objects into the composite spatial audio object, in step s156, the composite spatial audio object is rendered at a virtual position which depends on the reference position. The composite spatial audio object may be rendered binaurally.

1. First Step (Step s152): Forming a Cluster

In one embodiment, audio objects that should or may be combined for rendering may be pre-selected at an encoder side, for example, by a content producer, a content production platform/application, or the encoder.

The selection may be based on a clustering analysis algorithm that uses at least spatial positions of individual audio objects contained in an object-based audio scene as input data. For example, audio objects that are positioned within a certain distance from each other may be included in a cluster.

Figure 2:
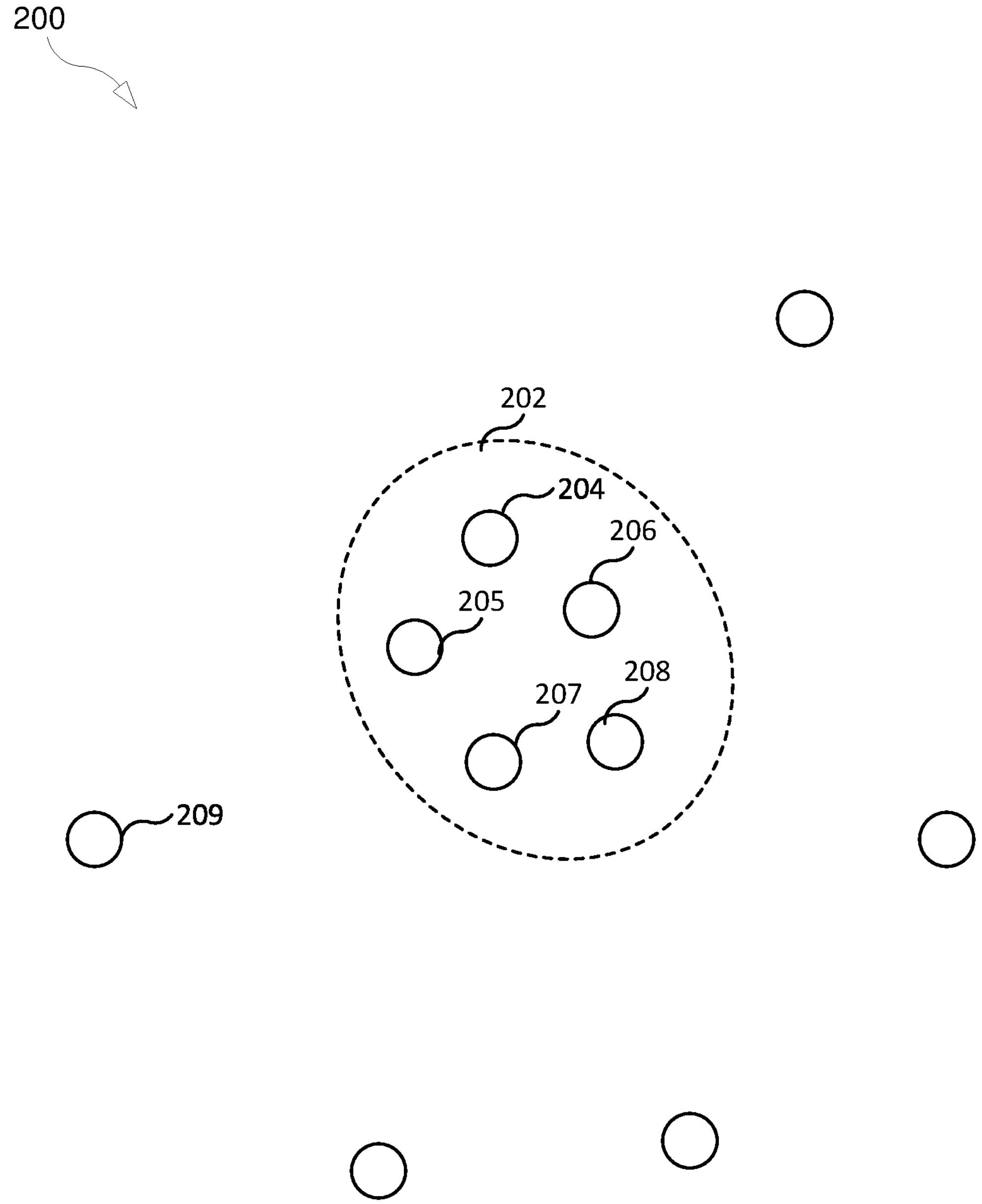
FIG. 2 shows an exemplary object-based audio scene.

FIG. 2 shows an exemplary object-based audio scene 200 containing multiple audio objects (e.g., objects 204-209). As shown in FIG. 2, in the audio scene 200, the clustering analysis algorithm concludes that, based on spatial positions of the individual audio objects, the objects located within elliptic boundary 202 (i.e., the objects 204 to 208) may be treated as a cluster.

The distance metric that is used in the clustering analysis may be an absolute (e.g., Euclidian) distance, or it may be a relative (e.g., angular) distance relative to some reference position (e.g., an origin of the scene).

There are many known clustering algorithms that may be used for carrying out the position-based clustering analysis. Examples of such algorithms are described in https://en.wikipedia.org/wiki/Cluster_analysis.

The amount of clustering may be controlled by a specific choice of clustering criteria which is used in the cluster analysis algorithm. For example, if the clustering criteria is that audio objects which are positioned less than a Euclidian distance (Dcluster) away from each other should be clustered (i.e., included in the same cluster), the amount of clustering can be controlled by changing the value of Dcluster.

When the value of Dcluster is large, audio objects that are within a larger spatial range from each other will be clustered, resulting in a heavier clustering. On the other hand, if the value of Dcluster is small, only audio objects that are close to each other will be clustered, resulting in a lighter clustering.

In some embodiments, the clustering process may be controlled such that no more than a certain maximum number of audio objects or audio signals is rendered. In such embodiments, the clustering criteria (e.g., Dcluster) may be set adaptively or iteratively based on the maximum number of resulting audio objects or signals.

As explained above, a desired clustering may be set in terms of the minimum distance between audio objects or in terms of the maximum number of resulting audio objects or signals after clustering, and a suitable clustering algorithm may be chosen and configured accordingly.

In media streaming use cases in which there is a communication from a renderer (a.k.a., "decoder") back to an audio object source (e.g., encoder), the decision of whether to apply clustering and/or how much clustering to apply may be determined by considering available computational resources in the renderer. For example, when it is signaled that enough computational resources are available at the renderer to do an individual rendering of all objects, the cluster analysis process may decide that no clustering should be applied at all, so that maximum spatial accuracy is maintained in the rendered scene. But if at some moment it is signaled that the resources are too limited to do a full individual object rendering, the clustering analysis process identifies one or more clusters of objects that will be transformed prior to rendering, with the amount of clustering being dependent on the available resources. Typically, the lower the amount of available processing resources in the renderer is, the larger the amount of clustering is to be applied.

The clustering may be dynamic. In other words, the clustering may be changed over time as a result of changes in a scene. For example, if the scene contains moving objects, then individual objects may move in and out of the clusters, or in some instances the clustering may even change completely.

In some embodiments, a cluster of audio objects to be transformed is selected at a decoder side (either by a decoder/renderer or by a user application).

In selecting a cluster of audio objects, perceptual factors may be taken into account. For example, spatial, temporal, and/or frequency masking properties may be used to identify audio objects that may be combined without noticeable (or with acceptable) perceptual consequences. Examples of such perceptually motivated cluster analysis strategies are described in U.S. Pat. No. 9,805,725.

In addition to the spatial and perceptual properties, other properties of audio objects may be used in selecting audio objects that may be combined for rendering. For example, audio objects that are related to the same visual object in the scene or objects that share some common semantic meaning in the scene may be selected for combining. In some cases, the selection may even be done manually, for example by a content creator.

A result of step s152 is the identification of audio objects that may be combined in the rendering. For example, the output of step s152 is metadata, such as a particular cluster identifier assigned to all of the audio objects included in a particular cluster.

2. Second Step (s154): Transforming a Cluster of Audio Objects into a Composite Spatial Audio Object In step s154, a cluster of audio objects is spatially transformed into a composite spatial audio object that represents the spatial ensemble of the audio objects included in the cluster. The transformation is performed with respect to a reference position located within the cluster.

The composite spatial audio object resulting from the transformation is a single spatial entity in the sense that it can be rendered and manipulated as a single unit (like a traditional audio object). As compared to a conventional audio object, however, a composite spatial audio object contains multiple audio signals, which together capture the relative spatial information of multiple individual audio objects represented by the composite spatial audio object.

The spatial transformation process also generates corresponding metadata for the composite spatial audio object (e.g., positional metadata that specifies a position of the composite spatial audio object and spatial extent metadata that specifies spatial extent of the composite spatial audio object). Different types of a composite spatial audio object are described in reference [6] and reference [7].

To reduce rendering complexity of scenes containing many audio objects, the spatial transformation process will typically (but not necessarily) result in a composite spatial audio object that contains a number of audio signals that is smaller than the number of individual audio objects it represents. In such case, the transformation process may also be referred as "spatial downmixing." It should be noted that the term "spatial downmixing" may also refer to a more general "spatial transformation" described above.

In the related arts, the spatial transformation process uses a listener's position as a reference position for generating a spatial downmix, which results in a listener-centric, "sweet spot" downmix which is only valid for a specific listening position and for a specific spatial constellation of audio objects.

In contrast, as described herein, the spatial transformation is performed with respect to a reference position located within the cluster of audio objects that have been selected to be combined. Performing the spatial transformation with respect to the reference position within the cluster allows the transformation to be essentially independent of a user's (virtual) listening position. This allows the spatial transformation to be more efficient in terms of updating the rendering in response to changes in the position of the user and/or the audio objects within the scene, and enables flexible manipulation of the transformed cluster as a single spatial entity (i.e. spatial audio object). Several methods may be used to generate a spatially downmixed spatial object.

2-1. Transformation into an HOA Spatial Audio Object

In one embodiment, a cluster of individual audio objects identified in step s152 may be spatially transformed into a single spherical harmonics (HOA) representation with respect to a reference position within the cluster. The spherical harmonics representation may be derived using any known method.

One method of deriving the spherical harmonics representation is to do a direct expansion of the source fields of the individual audio objects into their spherical harmonics representation at the reference position, and then to sum their corresponding spherical harmonics coefficients. The spherical harmonics expansion at a reference position $\vec{r}=(r, \theta, \varphi)$ due to a point source positioned at $\vec{r}_s=(r_s, \theta_s, \varphi_s)$ is:

$$P_s(\vec{r}, \vec{r}_s, \omega) = ikS(\omega)\sum_{n=0}^{\infty} j_n(kr)h_n(kr_s)\sum_{m=-n}^{n} Y_n^m(\theta, \varphi)Y_n^m(\theta_s, \varphi_s)^*,$$

where S(ω) is the source signal and k=ω/c is the wavenumber.

At the same time, the general expression for the spherical harmonic decomposition of the sound field at the reference position $\vec{r}=(r, \theta, \varphi)$ is:

$$P(r, \theta, \varphi, \omega) = \sum_{n=0}^{\infty}\sum_{m=-n}^{n} A_n^m(\omega)j_n(kr)Y_n^m(\theta, \varphi),$$

where $$A_n^m(\omega)$$

is the spherical harmonic coefficients of the sound field at $\vec{r}$. The two expressions disclosed above are described in M. Poletti, "Three-dimensional surround sound systems based on spherical harmonics", J. Audio. Eng. Soc. 53(11), 2005.

Equating the two expressions above, the spherical harmonic coefficients for the sound field due to the point source at a source position $\vec{r}_s$ are given by:

$$A_n^m(\omega) = ikS(\omega)h_n(kr_s)Y_n^m(\theta_s, \varphi_s)^*.$$

The set of spherical harmonics coefficients $$T_n^m(\omega)$$

representing the total sound field at the reference position $\vec{r}$ due to L objects then follows from summing corresponding coefficients:

$$T_n^m(\omega) = \sum_{l=1}^{L} A_{l,n}^m(\omega).$$

The total pressure $P_L$, at the reference position $\vec{r}$ due to L individual objects is then given by:

$$P_L(r, \theta, \varphi, \omega) = \sum_{n=0}^{\infty}\sum_{m=-n}^{n} T_n^m(\omega)j_n(kr)Y_n^m(\theta, \varphi).$$

In practical implementations, the coefficient set may be truncated at a maximum order N that depends on the desired spatial resolution of the resulting spatial audio object (i.e., how much of the spatial detail of the spatial distribution of the original objects one wants to preserve). For a 3-dimensional spherical harmonics representation, this results in $(N+1)^2$ coefficients per frequency bin. If single indexing of spherical harmonics components with an index i running from 1 to $(N+1)^2$ is adopted, then the truncated set of spherical harmonics coefficients representing the total sound field due to L objects may be written in matrix notation as $\vec{T}=A\vec{S}$, where $\vec{S}$ is the source signal vector containing the L object source signals $S_l(\omega)$, A is the $(N+1)^2$-by-L matrix of source-signal normalized spherical harmonics coefficients $$A_{l,n}^m(\omega) / S_l(\omega)$$

of the individual source objects, and $\vec{T}$ is the vector containing the resulting $(N+1)^2$ coefficients (all at a frequency ω).

The spatial transformation of the cluster of individual objects into the single spherical harmonic representation may be interpreted and implemented as a filtering operation on the original object source signals, with the filters being defined entirely by the positions of the objects.

In use cases where it is sufficient to have a resulting spatial resolution for the spatial audio object that is comparable to that of a conventional stereo recording, then the maximum order N may be set to 1, in which case there are 4 coefficients per frequency bin. This means that a reduction of complexity is achieved whenever there are more than 4 objects in the cluster (with the complexity reduction increasing with the number of objects), while the most important spatial properties of the cluster of objects are still preserved.

In use cases where a more accurate preservation of the original spatial properties of the cluster is desired, a higher value for N may be chosen, leading to e.g., 16 coefficients per frequency bin for N=3.

Note that if the maximum order N is set to 0, then there is only one coefficient per frequency bin for each individual object, which is given by (using the zero-order properties of the spherical Hankel- and spherical harmonics functions):

$$A_0^0(\omega) = S(\omega)\frac{e^{ikr_s}}{r_s}.$$

The total pressure at reference position $\vec{r}$ due to L individual source objects then follows from (using the zero-order properties of the spherical Bessel- and spherical harmonics functions):

$$P_L(r, \theta, \varphi, \omega) = \sum_{l=1}^{L} S_L(\omega)\frac{e^{ikr_l}}{r_l}.$$

From this equation it can be concluded that the representation resulting from the zero-order transformation is a position-independent pressure that is a simple addition of the individual pressures at the origin of the coordinate system. So, if the reference position $\vec{r}$ is chosen as the origin, then the result of the zero-order transformation is effectively a mono downmix of all individual source objects with respect to the reference position.

The maximum order of the spherical harmonics representation may be (dynamically) adapted to the spatial complexity of the cluster of audio objects to be downmixed and/or to system capabilities (e.g. regarding transmission bandwidth, renderer capabilities, available processing resources, etc.).

This adaptation of the maximum order may be done at the moment of transforming the cluster of objects to the spherical harmonics representation. Additionally, or alternatively, the renderer may decide to render the spherical harmonics representation using a lower maximum order than the one used in the transformation, by truncating the representation to this lower order (e.g., to (temporarily) cut down on the processing requirements). Thus, even if the cluster is transformed to a high-order spherical harmonics representation, the renderer might choose to use only the first few harmonics.

The spatial transformation described above takes the distance of the individual objects to the reference position into account, via the inclusion of the spherical Hankel function $h_n$ in the source field expansion.

Since this spherical Hankel function is somewhat costly to evaluate in real-time, it may in some use cases be attractive to derive a less costly approximation of the expressions above, although it should be realized that the evaluation of the function only needs to take place when the position of an individual source changes within the cluster (it does not need to be evaluated when the position of the listener changes, or when the cluster of objects is translated or rotated within the scene as a unit).

Still, if desired, a simplified version of the embodiment can be obtained by assuming that the individual objects are located far away from the reference position, leading to an approximation of the source field of each individual audio object by a plane wave instead of a spherical wave. In that case the expression for the resulting spherical harmonics coefficients for an individual object simplifies to:

$$A_n^m(\omega) = 4\pi i^n S(\omega) Y_n^m(\theta_s, \varphi_s)^*.$$

An undesirable effect of this approximation is that the relative gain and phase information due to the different distances of the individual objects is lost. At the reference position, this information can be restored by addition of scaling and phase terms that are a function of the distance from the individual objects to the reference position, according to:

$$\hat{A}_n^m(\omega) = A_n^m(\omega)\frac{e^{i\phi(\omega)}}{r_s},$$

with $r_s$ the distance of the object to the reference position and $\phi(\omega)$ the relative phase at frequency $\omega$, which is a direct function of the distance $r_s$. This corrected simplified representation is correct at the reference position, but not entirely at other positions. This is not a real problem because the main focus is the representation at the reference position.

A person skilled in the art would know how to derive similar equations as provided above for a two-dimensional case where all objects in the cluster lie within the same 2D plane. In that case only (2N+1) coefficients per frequency bin are needed for an N-th order representation of the cluster, so that e.g. a $3^{rd}$-order representation only requires 7 coefficients.

So, in the 2D case a desired spatial resolution can be obtained with fewer coefficients (compared to 3D), making the spherical harmonics representation already efficient at a lower number of objects in the cluster (or, equivalently, a given number of coefficients results in a higher spatial resolution).

Another method for obtaining the total spherical harmonics representation at the reference position due to an arbitrary number of individual audio objects, is to derive the total spherical harmonics coefficients from the signals of a virtual HOA microphone setup centered at the reference position, for example, as described in M. Poletti, "Three-dimensional surround sound systems based on spherical harmonics", J. Audio. Eng. Soc. 53(11), 2005 and J. Meyer & G. Elko, "A highly scalable spherical microphone array based on orthonormal decomposition of the sound field", Proc. IEEE Int-Conf. on Acoustics, Speech and Signal Processing, vol. 2., 2002. Essentially this means that the sound field due to all the point sources is sampled on a (typically) spherical surface around the reference position, after which the sampled sound field is transformed into the spherical harmonic coefficients at the origin of the sphere (i.e. the reference position). The mathematics are somewhat different than for the direct expansion method described above, but a person skilled in the art would realize that the resulting representation is essentially the same.

Some advantages of the spatial audio object representation resulting from this embodiment for the spatial transformation are: (1) it is completely independent from any listening position (in stark contrast to prior art solutions), so it remains valid regardless of changes of the user position; (2) this also implies that the same representation can be used for multiple listeners at different positions; (3) it captures the spatial information from individual source objects in all directions in the cluster equally, including their distance information (if the non-simplified version of the embodiment is used); (4) it is effectively an independent spatial entity that can be moved (translated and rotated) as a single unit within the scene without requiring any changes to the representation; (5) if relative positions of objects within the cluster change, the filter matrix can easily be updated to reflect the changes.

Examples of use cases for which this embodiment may be suitable, is a crowd of people located in some bounded area in the scene, a band of musicians on a stage, a choir, etc.

2-2. Transformation Using a Virtual Microphone Configuration

Another embodiment for spatially downmixing a cluster of audio objects into a single spatial audio object uses a virtual microphone setup positioned at a reference position within the cluster of audio objects.

Figure 3:
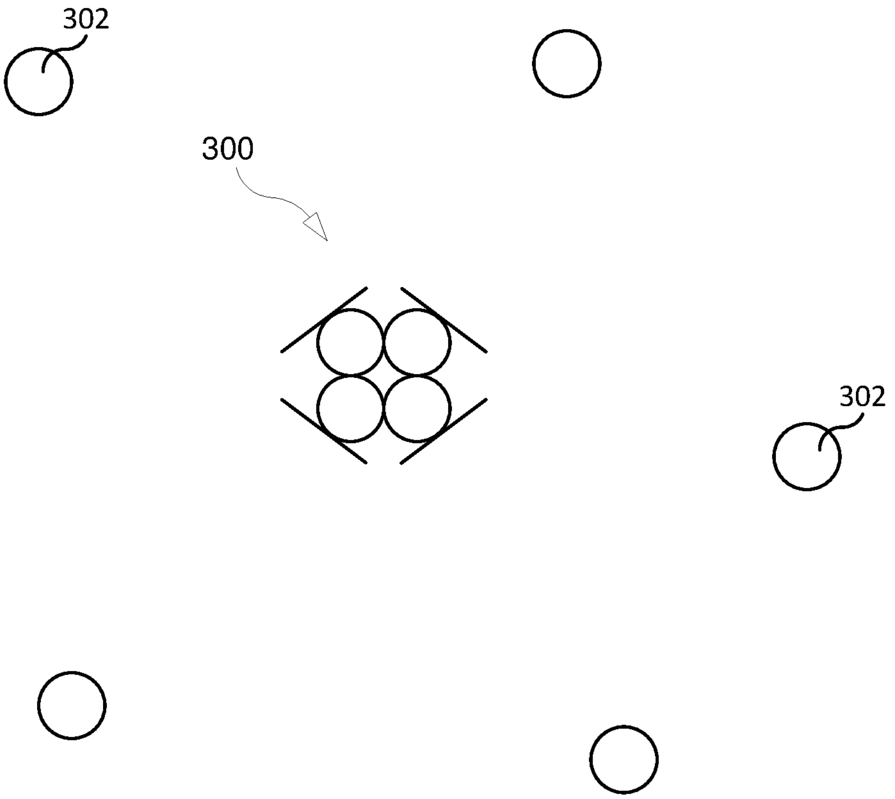
FIG. 3 shows an exemplary virtual microphone setup.

FIG. 3 shows an exemplary virtual microphone setup 300 positioned within a cluster of individual audio objects 302. As shown in FIG. 3, the reference position for the virtual microphone setup 300 may be a central position within the cluster (e.g., a geometric centroid of the cluster).

Using metadata (e.g., positional metadata and/or gain metadata) of the individual audio objects 302 in the cluster, the objects 302 may be downmixed to the virtual microphone setup, resulting in virtual microphone signals as if the sound of the objects were recorded by the virtual microphone setup.

The virtual microphone setup may be a two-dimensional (2D) or a three-dimensional (3D) virtual microphone array. Specifically, the virtual microphone array may be a virtual cross-array of virtual stereo microphone setups in orthogonal directions. The virtual microphone array may produce multiple downmix signals, specifically stereo downmix signals representative for virtual stereo microphones in orthogonal directions. In some embodiments, alternative virtual microphone arrays (e.g., spherical or tetrahedron arrays) may be used and known techniques may be used to derive orthogonal stereo downmix signals from these.

Compared to the technique of using some form of pre-rendering on a virtual loudspeaker configuration, this embodiment provides the advantage that the spatial downmix is independent from the user position. This means that the spatial downmix does not need to be re-done when the user position changes within the scene, contrary to other solutions which require a new spatial downmix whenever the position of a user changes.

The same advantage holds when the cluster of objects moves or rotates as a whole within the scene since such a change can be seen as equivalent to a change of user position relative to the cluster.

The virtual microphone setup may be a single virtual stereo microphone setup and the spatial downmix may be a single stereo downmix. Thus, the resulting representation of the composite spatial audio object may be a stereo signal plus corresponding metadata, where the metadata includes at least the reference position of the virtual microphone setup (e.g., the coordinates of the midpoint between the virtual microphones), for example, as described in reference [7]. In this case, a reference orientation for the single virtual stereo microphone setup should be selected such that it is representative of the most common (e.g., default) direction of observation for users experiencing the scene.

Compared to using a 2D or a 3D virtual microphone array, this simplification somewhat limits the flexibility in adapting the spatial rendering of the downmixed cluster to changes in user position. But, in many use cases, it can provide an attractive combination of a highly reduced complexity and a reasonable preservation of the main spatial properties of the original cluster of individual objects.

Reference [7] describes methods that allow adapting the spatial rendering of the single virtual stereo microphone signal of this embodiment such that a reasonable adaptation to changes in user position can still be obtained.

When using these methods, the spatial downmix representation according to this embodiment has some of the same advantages (e.g., being essentially independent of listening position and being suitable for multiple listeners at different positions) that the first embodiment (i.e., the HOA spatial object embodiment) provides.

To properly preserve the relative gains of the objects within the cluster in the spatial downmix, weights may be applied to the individual objects that compensate for their respective distance to the reference position of the virtual microphone setup. In case that directional (e.g., cardioid) virtual microphones are used, the weights may compensate for this as well.

This is illustrated in FIG. 3, which is a zoom of the cluster of selected objects indicated in FIG. 2. In FIG. 3, a virtual microphone array setup for generating a spatial downmixed spatial object is placed within the cluster.

If gains (indicated in the object metadata) associated with individual audio objects 1, 2, and 3 are g1, g2 and g3, due to different distances of the three objects to the virtual microphone setup, the relationship between the signal levels of these three objects in the resulting spatial downmix signal is modified in an inappropriate way. For example, if object 1 is closer to the virtual microphone setup than object 2, it will be louder in the resulting downmix. Similarly, if object 2 is closer to the virtual microphone setup than object 3, object 2 will be louder than object 3 which is located at the furthest distance from the microphones of the three objects. To reflect this difference, compensation gains may be applied to the objects in the spatial downmix process. Specifically, if the distances from the objects to the notional center of the virtual microphone setup are d1, d2, and d3, respectively, compensation gains that are inversely proportional to these distances may be applied in the downmixing.

Similar compensation gains may be applied to compensate for level balance modifications that result from non-uniform virtual microphone directivity patterns.

2-3. Generating a Spatial Downmix Using Panning Technique

In another embodiment, the audio objects included in the cluster are placed directly onto spatial axes (e.g., the left-right, the front-back, and the up-down axes) of the downmix, for example, by intensity panning of a mono signal of each individual audio object between channels of the spatial downmix.

Figure 4:
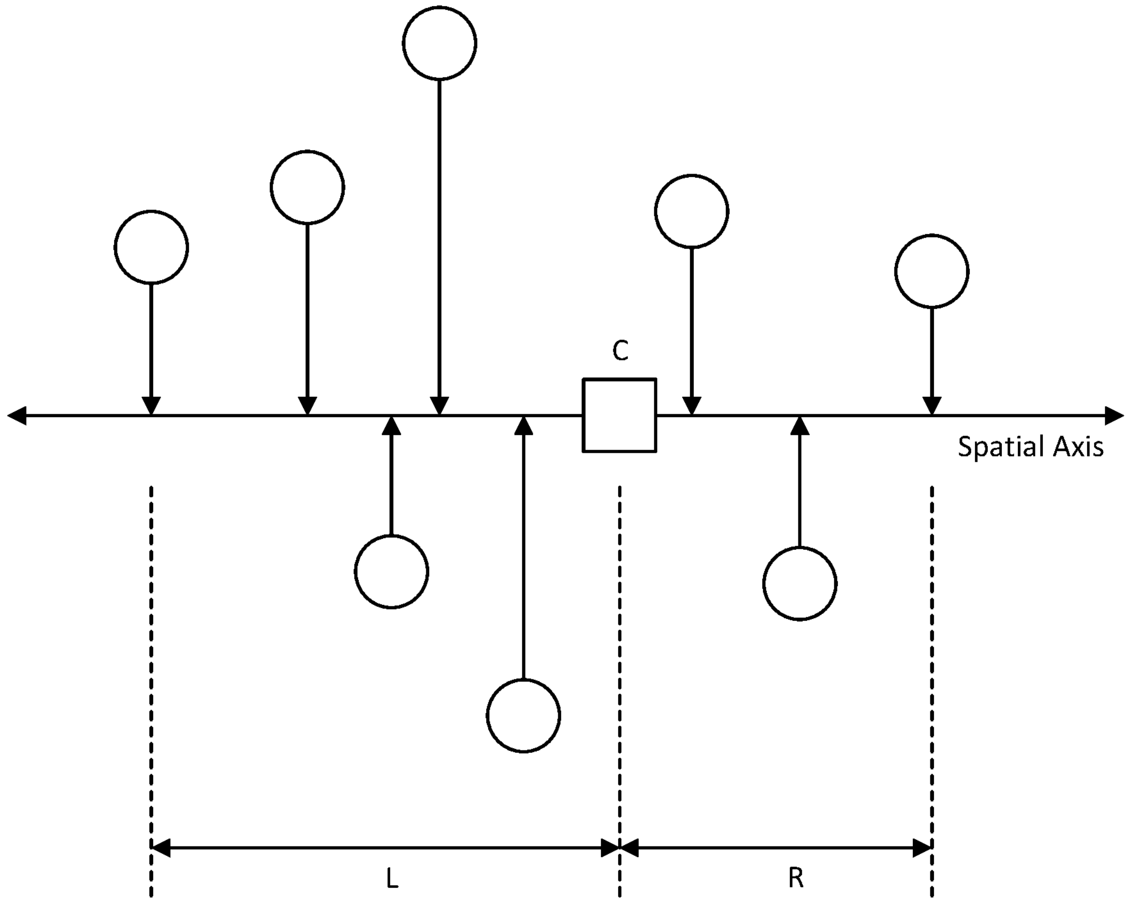
FIG. 4 illustrates a panning technique according to some embodiments.

Given a reference position within the cluster and reference spatial axes for the spatial downmix, the audio objects in the selected cluster are panned along each axis according to their respective projected position on the axis relative to the reference position, as illustrated in FIG. 4 (the square labeled C in FIG. 4 represents the reference position). The individual audio objects' gains are preserved in the panning. Thus, this embodiment eliminates the need for compensation gains that were needed in the second embodiment of the second step (i.e., step s154).

To enable rendering the downmixed spatial audio object with the correct spatial extent at any listening position, the value of the largest projected distance found for any of the downmixed objects may be included as metadata with the downmixed cluster and is to be used as a reference in the rendering. In the example shown in FIG. 4, the largest projected distance corresponds to the value of "L."

To make effective use of the downmix signals' informational capacity, the panning may be done such that the audio object with the largest projected distance to the reference position is always panned to the extreme left or right (or up/down, front/back, respectively) of the downmix signal, depending on which side it is on. In other words, the panning function is normalized. Since, as described above, the spatial extent information is included with the spatial audio object, the "correct" spatial extent can be reconstructed from the downmix that has been normalized in this way.

In a further refinement of this embodiment, the normalization of the panning may be done separately for each side of an axis (i.e., left and right, up and down, front and back), to make maximum use of the stereo downmix signal's informational capacity. In this case, the values of the largest projected distances for both sides of the downmix signal (in the example the values of both "L" and "R") would be included as metadata with the downmixed spatial audio object.

2-4. Transformation Using an External Spherical Harmonics Expansion

In the first embodiment of performing the spatial transformation process, transforming the selected audio objects into an HOA spatial audio object results in a spherical harmonics representation that describes the incoming sound field of the individual audio objects at the reference position within the cluster as if a virtual HOA microphone at the reference position had recorded the sound field.

In principle, however, this representation is only valid within a certain volume around the reference position. This means that an additional transformation step is required to finally render the resulting spatial audio object to a listener at an arbitrary position outside of this volume. Examples of such transformations going from an internal HOA representation to an externally valid spatial representation are described in, for example, reference [6].

A complementary external spherical harmonics representation may describe the outgoing sound field of one or more sources located in the interior of a spherical volume at the surface of which the sound field is (virtually) sampled, as described in reference [10]. The resulting representation is in principle only valid outside the spherical sampling volume.

The advantage of transforming the individual audio objects to a spatial audio object in this representation is that it can be used directly for rendering the resulting spatial audio object to a listener at an arbitrary external listening position without the need for an additional transformation that is required in the case of an HOA spatial audio object.

3. Third Step (Step s156): (Binaural) Rendering of the Spatially Downmixed Cluster of Audio Objects (i.e., the Composite Spatial Audio Object) to the User The composite spatial audio object may be rendered as being located at a defined virtual position in space and having a defined spatial extent by using metadata (e.g., positional metadata and/or spatial extent metadata) which is a part of the composite spatial audio object's representation. The virtual position of the composite spatial audio object may be defined in absolute terms (i.e., relative to the coordinate system of the virtual scene) or relative to the position of the user.

In one embodiment, the virtual position for the composite spatial audio object is the same as the reference position used in the transformation step (e.g., the reference point of the transformation to a spherical harmonics representation or the reference position of the virtual microphone array setup used for generating a spatial downmix).

The rendering may be a binaural rendering over headphones.

In case that the generated composite spatial audio object has a spherical harmonic (HOA) representation, there are different methods of rendering the spatial audio object to a listener positioned somewhere exterior to the cluster of objects represented by the spatial audio object, for example, as described in reference [6].

In case that the generated composite spatial audio object consists of one or more stereo audio signals and metadata (e.g., as generated by the second and third embodiments of step s154), there may be different methods of rendering this particular type of spatial audio object, for example, as described in reference [7].

One advantage of representing an ensemble of selected audio objects as a spatial audio object is that it allows various efficient types of manipulations in the rendering step to be made to the spatial audio object as a single spatial entity. For example, spatial widening techniques may be applied to a spatial audio object to change its perceived spatial extent. Examples of such spatial widening techniques that may be used are described in reference [7].

Such spatial widening techniques may also be used to adapt the rendering to changes in the scene configuration (e.g., when the user gets closer to the spatial audio object) in a very efficient way. Also, it may provide content creators with a new, very efficient and easy-to-use artistic tool for controlling the spatial extent of complex spatial audio elements in a scene.

Further rendering-stage manipulations that are enabled by representing an cluster of selected audio objects as a composite spatial audio object include changing the position, orientation, gain, and/or frequency envelope of the spatial audio object.

As discussed above, the method of rendering a cluster of audio objects according to some embodiments enables a more efficient and more flexible rendering in multi-user scenarios, where multiple users are experiencing the same virtual scene at the same time, possibly also being aware of each other's presence within the scene. In such use cases, the same spatial audio object may often be used to efficiently render the spatial cluster of selected audio objects to all users, with only minor adaptations needed in the rendering step to optimize the rendering for each individual user.

4. Distribution of the First Step (Step s152—the Cluster Selection Step) and the Second Step (Step s154—the Spatial Transformation Step) between a Source Side (a.k.a., Encoder Side) and a Renderer Side (a.k.a., Decoder Side or User Side).

The first step (i.e., the step of forming clusters) may be performed either at the encoder side or at the decoder side. Similarly, the second step (i.e., the step of transforming the selected cluster of audio objects into a composite spatial audio object) may be performed either at the encoder side or at the decoder side as long as the second step is performed after the first step (i.e., the second step cannot be performed at the encoder side when the first step is performed at the decoder side).

Various configurations of distributing the first and second steps among the encoder side and the decoder side can be envisioned and each configuration has specific characteristics that may be particularly interesting for different types of use cases.

Figure 5A:
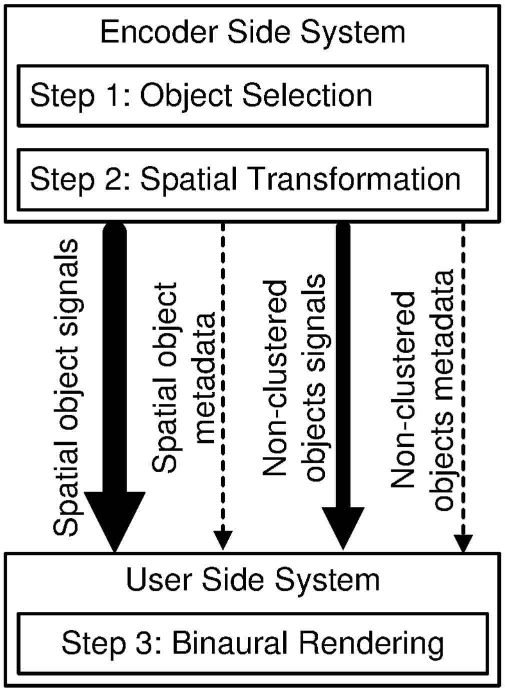
FIGS. 5A-5C and 6 show different configurations according to some embodiments.

In the configuration shown in FIG. 5A, both of the first and second steps are performed at the encoder side (which may include an actual encoder, a content authoring application, and/or a game engine). In one embodiment, the first and second steps are performed at the encoder side without any involvement of the decoder side (i.e., the encoder side performs the steps independently of the decoder side). The advantage of having the encoder side performs the first and second steps is that it typically results in (much) less audio data (i.e., fewer audio signals) to be transmitted to and rendered at the decoder side.

The clustering of audio objects performed at the encoder side may be static or may be dynamic in dependence of changes in a scene composition, which originate at the encoder side (e.g., as a result of the content authoring process).

Figure 5B:
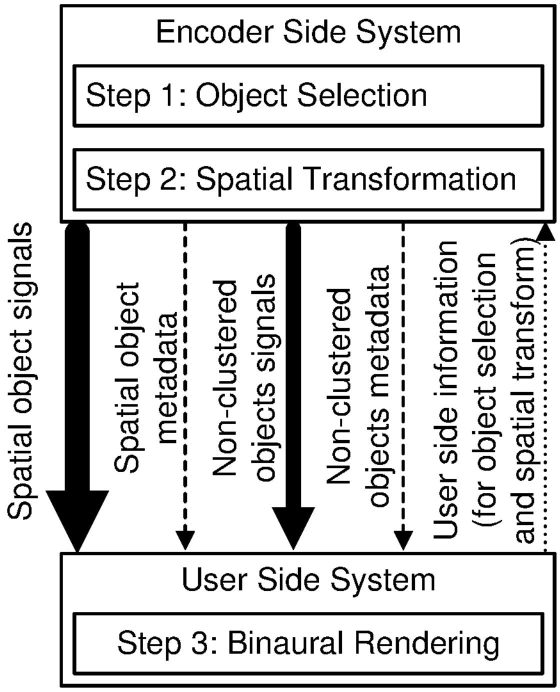

FIG. 5B shows another configuration in which the decoder side system transmits to the encoder side system information that guides the cluster selection and the spatial transformation, which is performed at the encoder side. The configuration shown in FIG. 5B is useful especially in real-time unicast streaming scenarios.

In one example, the decoder side system transmits to the encoder side system information about the amount of computational resources that is available for audio object rendering, information about the maximum number of audio objects or audio signals the decoder side system can currently render, and/or information about the amount of clustering that needs to be applied. The encoder side system then performs appropriate clustering and spatial transformations using the information received from the decoder side. Compared to the configuration shown in FIG. 5A, the configuration shown in FIG. 5B provides an additional advantage that the first step (i.e., clustering) and the second step (i.e., transformation) performed at the encoder side may be adapted to conditions (either statically or dynamically) of the decoder side system.

In another example, the decoder side system transmits to the encoder side system information about changes in a scene composition that originate at the decoder side (for example, as a result of user interactions) and the clustering at the encoder side may be changed dynamically depending on the changes in the scene composition.

Figure 5C:
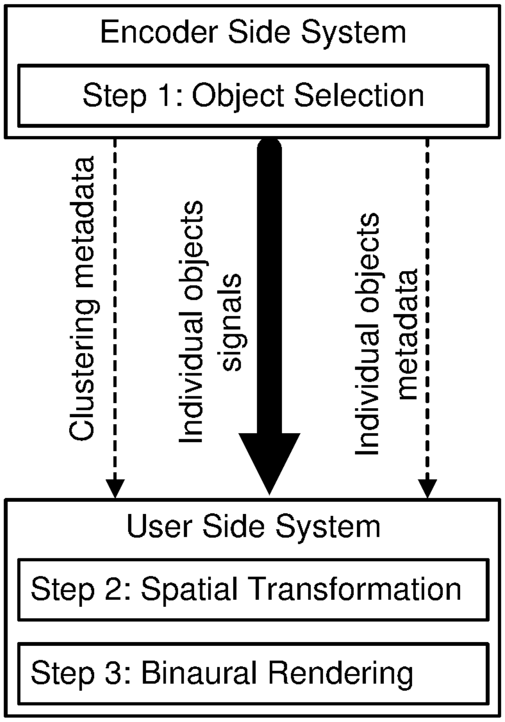

FIG. 5C shows a configuration in which the clustering is performed at the encoder side system while the transformation is performed at the decoder side system. In the configuration shown in FIG. 5C, the encoder side system inserts into the bitstream provided to the decoding side metadata that informs the decoder side system which objects may, if needed or desired, be combined for rendering. Such objects may for example be labeled in the bitstream with a common identifier that is attached to all individual objects that have been selected as belonging to the same cluster. For example, in one embodiment, each audio object included in the cluster comprises metadata (e.g., an <ObjectSource> data structure), and, for each audio object included in the cluster, the metadata data for the audio object is modified to include a cluster identifier that identifies the cluster.

The configuration shown in FIG. 5C provides the advantage of allowing the renderer to configure and adapt the clustering and/or transformation as needed (for example, in response to local changes in available computational resources or changes in audio scene complexity (e.g. the number of objects and other audio elements that are active in the scene)). In one-to-many streaming scenarios, this allows each individual renderer system to optimize its rendering independently, while still making use of common clustering information contained in the common bitstream.

As discussed above, in some embodiments, both of the clustering and the transformation are performed at the decoder side. The advantage of this embodiment is that no change to the encoder side system or to transmission format is needed and that the renderer has a full control over the whole process.

Figure 6:
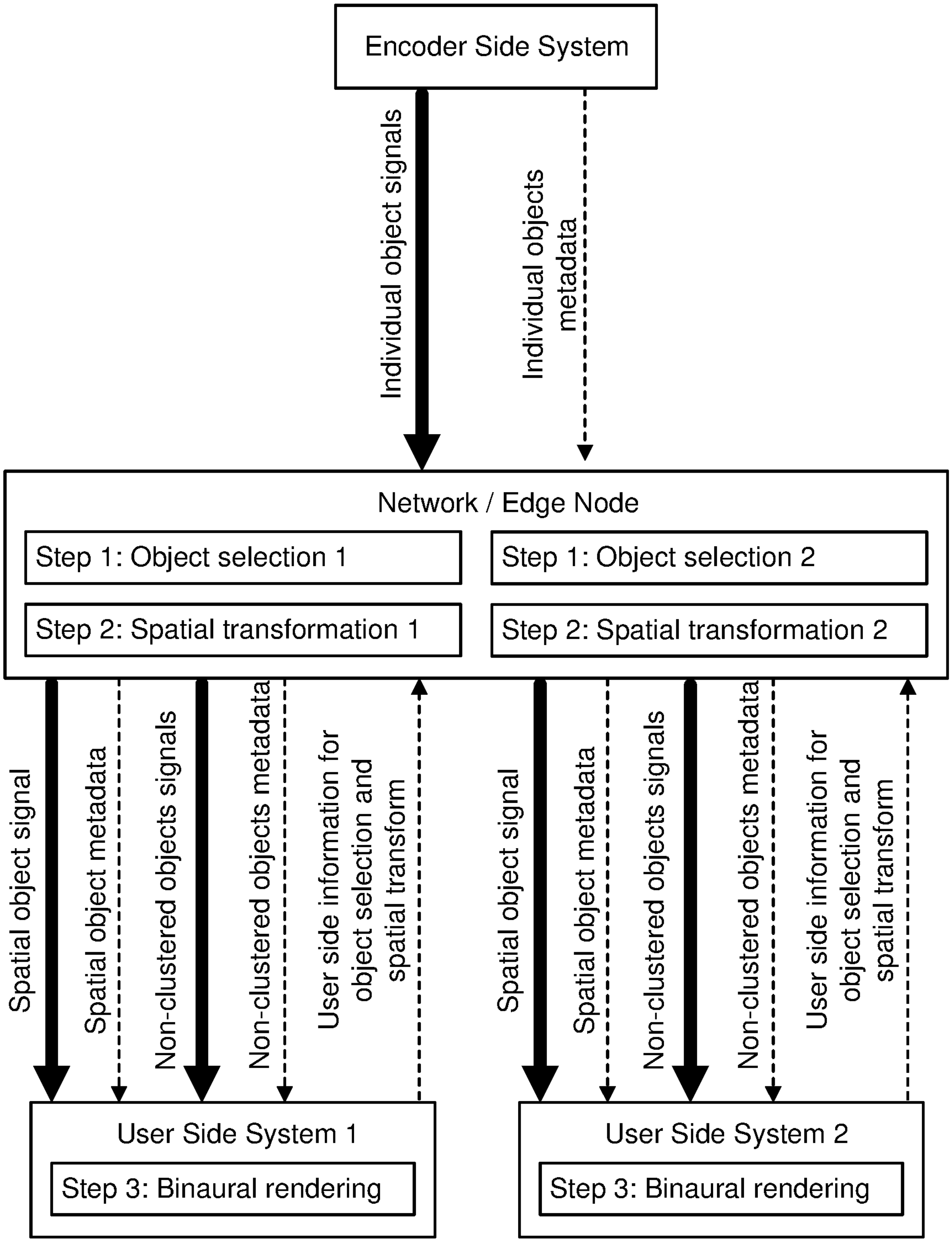

FIG. 6 shows a configuration in which an intermediate network node is provided between the encoder side system and the decoder side system and the network node performs the clustering and/or transformation. One of the reasons for having the intermediate network node perform the clustering and/or transformation is that, in some cases, the latency between the decoder side system and the encoder side system can be too large to perform dynamic cluster selection and the spatial transformation on the encoder side based on information about user interaction received from the decoder side.

The intermediate node may be selected so that it is located physically closer to the decoder side to reduce latency. The intermediate node may be a server (e.g., a mobile edge node) that is placed in the same area as the user(s). One encoder side system can serve several intermediate nodes which in turn can serve one or several decoder side systems. In some cases, the same object selection and the same spatial transformation may be reused for several clients, thus reducing the total work needed for the pre-rendering.

5. Metadata for a Composite Spatial Audio Object

In some embodiments, each audio object included in a cluster comprises an audio signal (e.g., a mono audio signal) and corresponding metadata, which includes position information indicating the position of the audio object in the XR scene. The metadata may include further information, such as, for example, gain information. The composite spatial audio object that is formed based on the transformation of the cluster comprises multiple audio signals and corresponding metadata. In one embodiment, the metadata for the composite spatial audio object comprises position information identifying a position of the composite spatial audio object in the XR scene and spatial extent information identifying spatial extent of the composite spatial audio object.

The spatial extent of the composite spatial audio object is a description of the size or shape of the composite spatial audio object in at least one dimension. Since the representation of the composite spatial audio object is source-centric, the spatial extent may also be defined in a source-centric way (e.g., specified in terms of the largest distance between two audio objects included in the cluster in one or more dimensions). Alternatively, the spatial extent may be specified in terms of angular width with respect to a listener-independent reference position (e.g., the origin of a scene coordinate system), or it may be specified as a mesh structure, e.g. by a set of vertices.

5-1. Position of the Composite Spatial Audio Object

The position of the composite spatial audio object may be a geometrical center (e.g., centroid) of the cluster from which the composite spatial audio object is formed. The geometrical center of the cluster may be derived using at least positions of the individual audio objects (it may also be derived using gains of the individual audio objects). Examples of algorithms that may be used to find the geometric center of a cluster of audio objects are described in the webpage located at en.wikipedia.org/wiki/Centroid.

In some embodiments, the position of the composite spatial audio object is derived from an arithmetic mean of positions (or the positions each of which is weighted by a gain of each audio object) of the individual audio objects included in the cluster. In case weighted positions of the individual audio objects are used to derive the position of the composite spatial audio object, the derived position is similar to the "center of mass" concept described in the webpage located at en.wikipedia.org/wiki/Center_of_mass.

The position of the composite spatial audio object may be derived in different ways. For example, the position may be derived by fitting the smallest sphere or regular polygon (or other form that has a center) that includes the selected audio objects in the cluster. In such case, the center of the fitted sphere or polygon may correspond to the position.

5-2. Spatial Extent of the Composite Spatial Audio Object

In one embodiment, the spatial extent of the composite spatial audio object may be derived from finding the largest distance between any two objects included in the cluster, in each of three (or two, or one) spatial dimensions. For example, the smallest shoebox shape, a rectangle (in 2D), or a line (in 1D) that includes all individual audio objects may be drawn, where the size of the shape is oriented along dimension(s) of the reference coordinate system. In such case, the spatial extent may be defined by three (or two, or one) numbers representing the size of the shape in different dimensions.

In a refined version of this embodiment, the absolute smallest shoebox shape (or rectangle, or line) including all individual audio objects may be determined, with the 3D orientation of the shape as an additional degree of freedom. Optimization algorithms for finding the smallest shoebox shape are widely available, and the orientation of the fitted box with respect to the scene coordinate system may be included as a part of the spatial extent metadata of the composite spatial audio object.

In other embodiment, the spatial extent of the composite spatial audio object is derived by fitting the smallest sphere that includes all individual audio objects included in the cluster. The sphere may be centered at the position of the composite spatial audio object (derived as described above) and the radius of the sphere may be determined by the individual audio object that is located at the largest distance from the position. This way, the spatial extent of the composite spatial audio object will be symmetrical around the position and is fully specified by the radius of the sphere.

In other embodiment, the spatial extent of the composite spatial audio object is derived by finding the absolute smallest possible sphere that includes all individual audio objects included in the cluster, where the center of the fitted sphere is not necessarily the same as the position of the composite spatial audio object. The sphere that is found in this way will be smaller than or will have the same size as the smallest sphere that is centered at the position. In this embodiment, the spatial extent of the composite spatial audio object is defined and specified by the radius and the center position of the fitted sphere.

In a further embodiment, the smallest ellipsoid that includes all individual audio objects included in the cluster may be used. In this embodiment, the spatial extent of the composite spatial audio object is defined and specified by (i) the size of the ellipsoid along three axes and (ii) the orientation of its main axis. The ellipsoid may be centered at the position of the composite spatial audio object. Alternatively, the absolute smallest ellipsoid may be fitted in which case the center position of the fitted ellipsoid is included as part of the spatial extent metadata.

Even though a circle and an ellipsoid are used as exemplary geometric shapes used for determining the spatial extent of the composite spatial audio object, any other shapes (e.g., a cylinder) may also be used. For example, the smallest simple polygon shape including all individual audio objects included in the cluster may be used for determining the spatial extent. In such case, the spatial extent may be defined as a mesh structure that is typically specified in the metadata as a set of vertices.

In the methods described above, the position of the derived spatial extent shape relative to the derived position of the composite spatial audio object may be specified (and included in the metadata) for each dimension as an offset relative to the position.

5-3. Examples of Metadata

<ObjectSource>

This metadata may be used to describe characteristics of individual audio objects as well as characteristics of a composite spatial audio object. The metadata for an audio object (individual audio object or composite spatial audio object) may include various attributes (e.g., "id,", "position," and/or gain). The attribute "id" identifies an individual audio object or a composite spatial audio object. The attribute "position" identifies the position of the audio object. The "gain" attribute identifies a gain for the audio object. In some embodiments, the metadata for an individual audio object may also include a "clusterId" attribute that identifies a cluster, if any, to which the individual object belongs. In some embodiments, the metadata for a composite spatial audio object may also include an "extent" attribute that identifies a spatial extent (described above) of the composite spatial audio object, specified in any of the ways described above.

<HOASource>

This metadata may be used to describe a composite spatial audio object represented by a spherical harmonics representation. The metadata may include various attributes (e.g., "position", "extent", "representation" and "transitionDistance"). The "position" and "extent" attributes may again correspond to the position and extent of the composite spatial object. The attribute "representation" defines whether the representation results from sources located outside a spatial sampling area (internal representation) or inside the spatial sampling area (external representation). The attribute "transitionDistance" determines the area in which the listener transitions between external representation and internal representation.

6. Example Implementation

Figure 7:
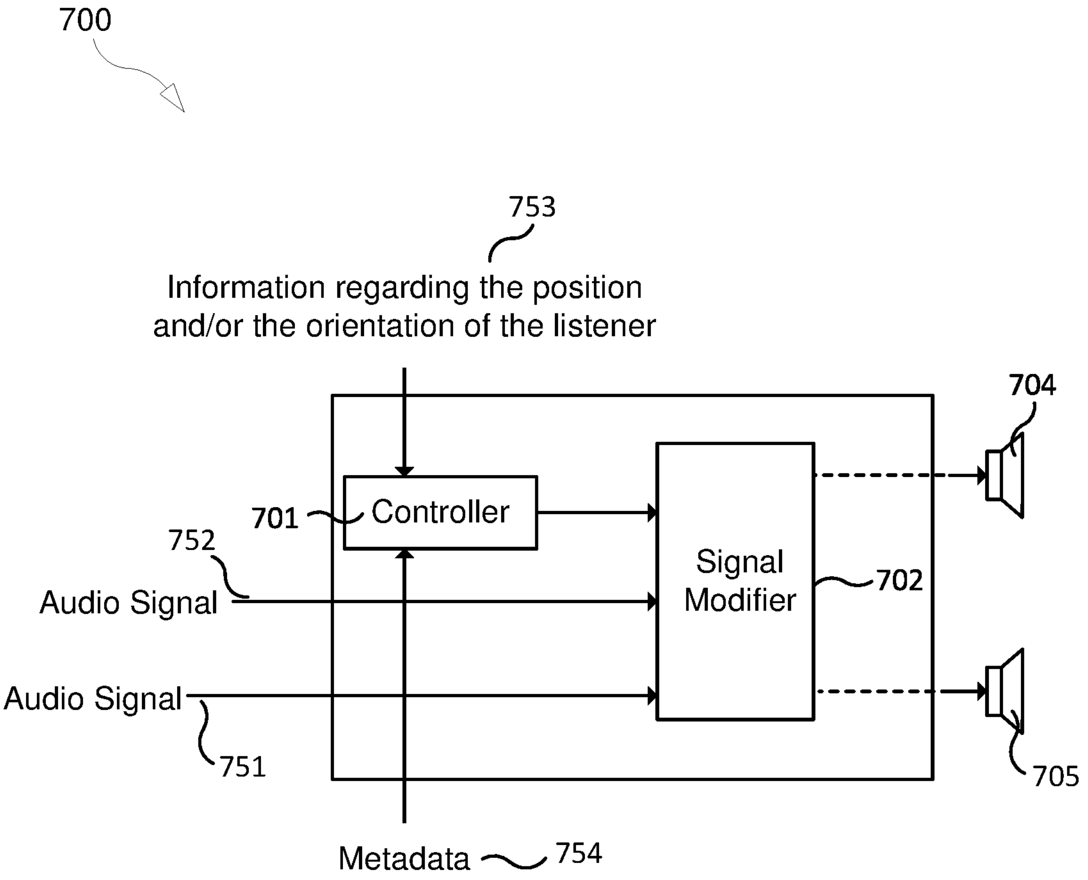
FIG. 7 shows a system according to some embodiments.

FIG. 7 shows an example system 700 for producing sound a for a XR scene. System 700 includes a controller 701, a signal modifier 702 for modifying audio signals 751 and 752, a left speaker 704, and a right speaker 705. While two audio signals and two speakers are shown in FIG. 7, this is for illustration purpose only and does not limit the embodiments of the present disclosure in any way.

Controller 701 may be configured to receive one or more parameters and to trigger modifiers 702 and 703 to perform modifications on left and right audio signals 751 and 752 based on the received parameters (e.g., increasing or decreasing the volume level). The received parameters are (1) information 753 regarding the position of the listener (e.g., direction and distance to an audio source) and (2) metadata 754 regarding the audio sources, as described above.

Figure 8A:
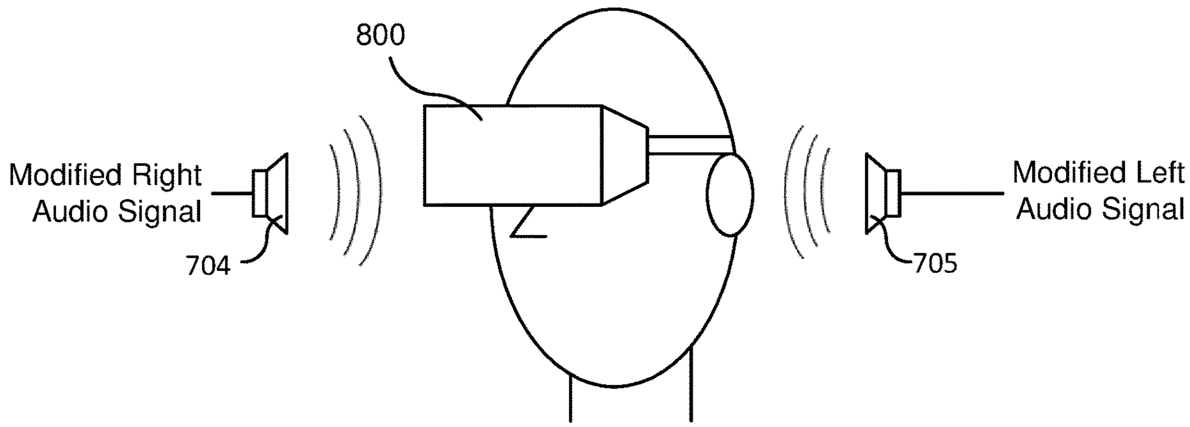
FIGS. 8A and 8B show a system according to some embodiments.
Figure 8B:
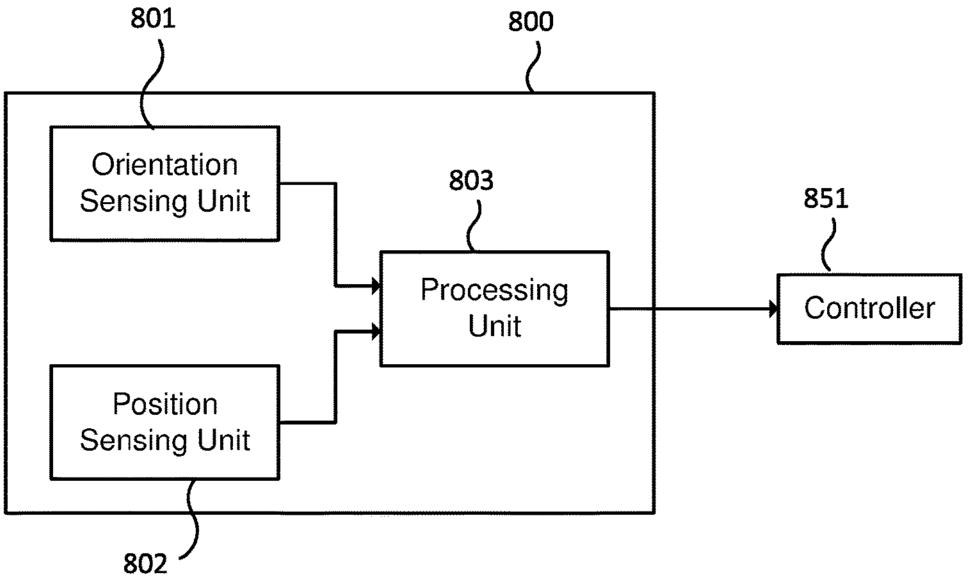

In some embodiments of this disclosure, information 753 may be provided from one or more sensors included in an XR system 800 illustrated in FIG. 8A. As shown in FIG. 8A, XR system 800 is configured to be worn by a user. As shown in FIG. 8B, XR system 800 may comprise an orientation sensing unit 801, a position sensing unit 802, and a processing unit 803 coupled to controller 851 of system 800. Orientation sensing unit 801 is configured to detect a change in the orientation of the listener and provides information regarding the detected change to processing unit 803. In some embodiments, processing unit 803 determines the absolute orientation (in relation to some coordinate system) given the detected change in orientation detected by orientation sensing unit 801. There could also be different systems for determination of orientation and position, e.g. a system using lighthouse trackers (lidar). In one embodiment, orientation sensing unit 801 may determine the absolute orientation (in relation to some coordinate system) given the detected change in orientation. In this case the processing unit 803 may simply multiplex the absolute orientation data from orientation sensing unit 801 and the absolute positional data from position sensing unit 802. In some embodiments, orientation sensing unit 801 may comprise one or more accelerometers and/or one or more gyroscopes.

Figure 9:
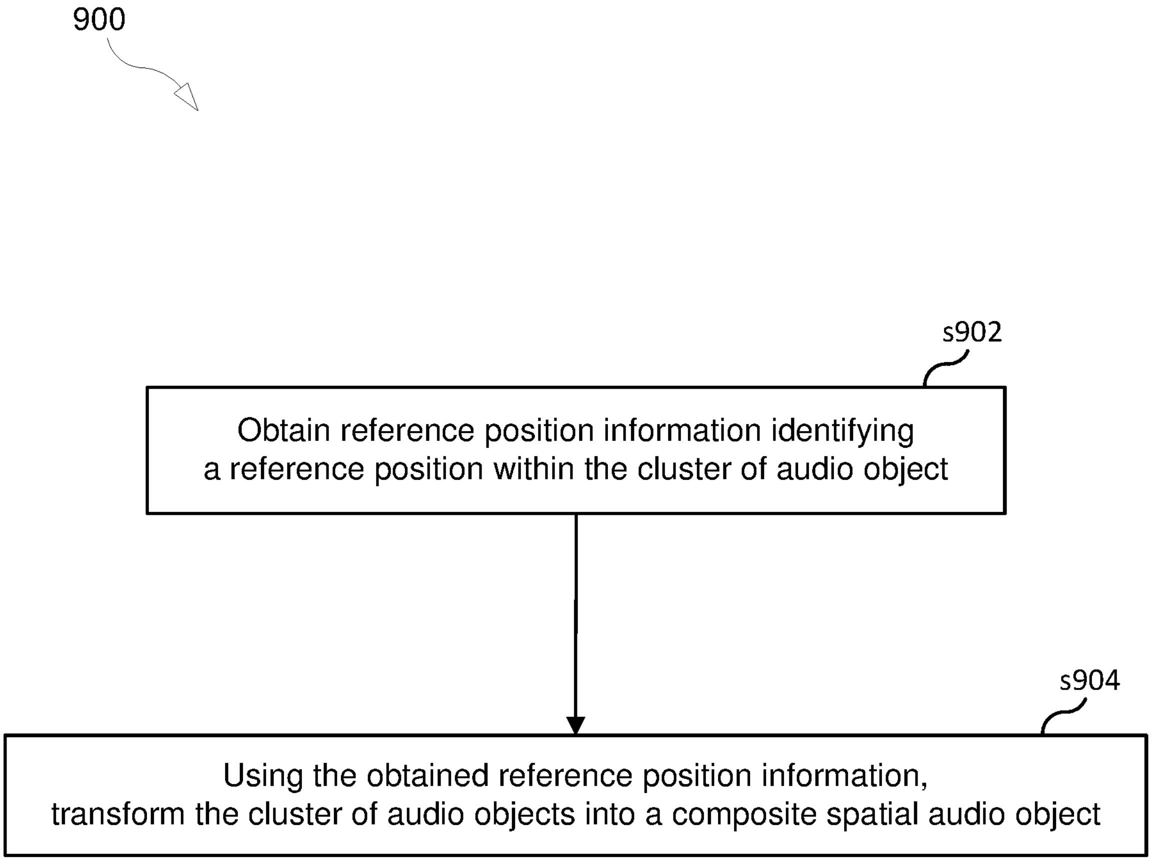
FIG. 9 is a process according to some embodiments.

FIG. 9 is a flow chart illustrating a process 900 for representing a cluster of audio objects. The process 900 may being with step s902.

Step s902 comprises obtaining reference position information identifying a reference position within the cluster of audio objects.

Step s904 comprises transforming the cluster of audio objects into a composite spatial audio object using the obtained reference position information. The transforming of the cluster of audio objects into the composite spatial audio object may be performed independently of any listening position of any user.

In some embodiments, the composite spatial audio object represents the cluster of audio objects and preserves relative spatial positioning information of the audio objects included in the cluster of audio objects.

In some embodiments, the process 900 further comprises for each audio object included in the cluster of audio objects, obtaining audio object metadata for the audio object and generating audio object metadata for the composite spatial audio object based on the obtained audio object metadata.

In some embodiments, the reference position information is obtained using the obtained audio object metadata for each audio object included in the cluster of audio objects.

In some embodiments, the metadata of the composite spatial audio object comprises position information identifying a position of the composite spatial audio object and/or spatial extent information identifying a spatial extent of the composite spatial audio object.

In some embodiments, the spatial extent of the composite spatial audio object comprises a dimension of the cluster of the audio objects and/or a distance between two outermost audio objects within the cluster of audio objects.

In some embodiments, the position of the composite spatial audio object is the reference position.

In some embodiments, the reference position is a geometric center of the cluster of audio objects.

In some embodiments, the process 900 further comprises identifying the cluster of audio objects from a set of M audio objects. The cluster of audio objects may consist of N audio objects, where N is less than or equal to M.

In some embodiments, identifying the cluster of audio objects is performed by a first device and transforming the cluster of audio objects into the composite spatial audio object is performed by a second device. The method may further comprise transmitting from the first device to the second device information for identifying the audio objects included in the cluster of audio objects.

In some embodiments, transmitting from the first device to the second device information for identifying the audio objects included in the cluster of audio objects comprises transmitting from the first device to the second device i) first audio object metadata for a first audio object included in the cluster of audio objects and ii) second audio object metadata for a second audio object included in the cluster of audio objects. The first audio object metadata may include a cluster identifier (e.g., clusterId=1) that identifies the cluster of audio objects and the second audio object metadata also includes the cluster identifier (i.e., clusterId=1), thereby indicating that both audio objects are members of the same cluster.

In some embodiments, identifying the cluster of audio objects from the set of M audio objects comprises determining a distance between a first audio object included in the set of M audio objects and a second audio object included in the set of M audio objects and including the first and second audio objects in the cluster of audio objects if the determined distance is less than a threshold distance.

In some embodiments, identifying the cluster of audio objects from the set of M audio objects is based on at least one of (1) information regarding computational resources available at a decoder or (2) scene change information.

In some embodiments, the cluster of audio objects consists of O audio objects, each of the O audio objects is associated with a single audio signal, and the composite spatial audio object is associated with not more than P audio signals, where P is less than O.

In some embodiments, the composite spatial audio object is a spherical harmonics representation of the cluster of audio objects.

In some embodiments, the composite spatial audio object is a multi-channel stereophonic representation of the cluster of audio objects.

In some embodiments, transforming the cluster of audio objects into the composite spatial audio object comprises spatially transforming the audio objects using a virtual microphone array or a virtual microphone located at the reference position.

In some embodiments, the process 900 may further comprise rendering the composite spatial audio object using position information identifying a position of the composite spatial audio object and/or spatial extent information identifying a spatial extent of the composite spatial audio object.

Figure 10:
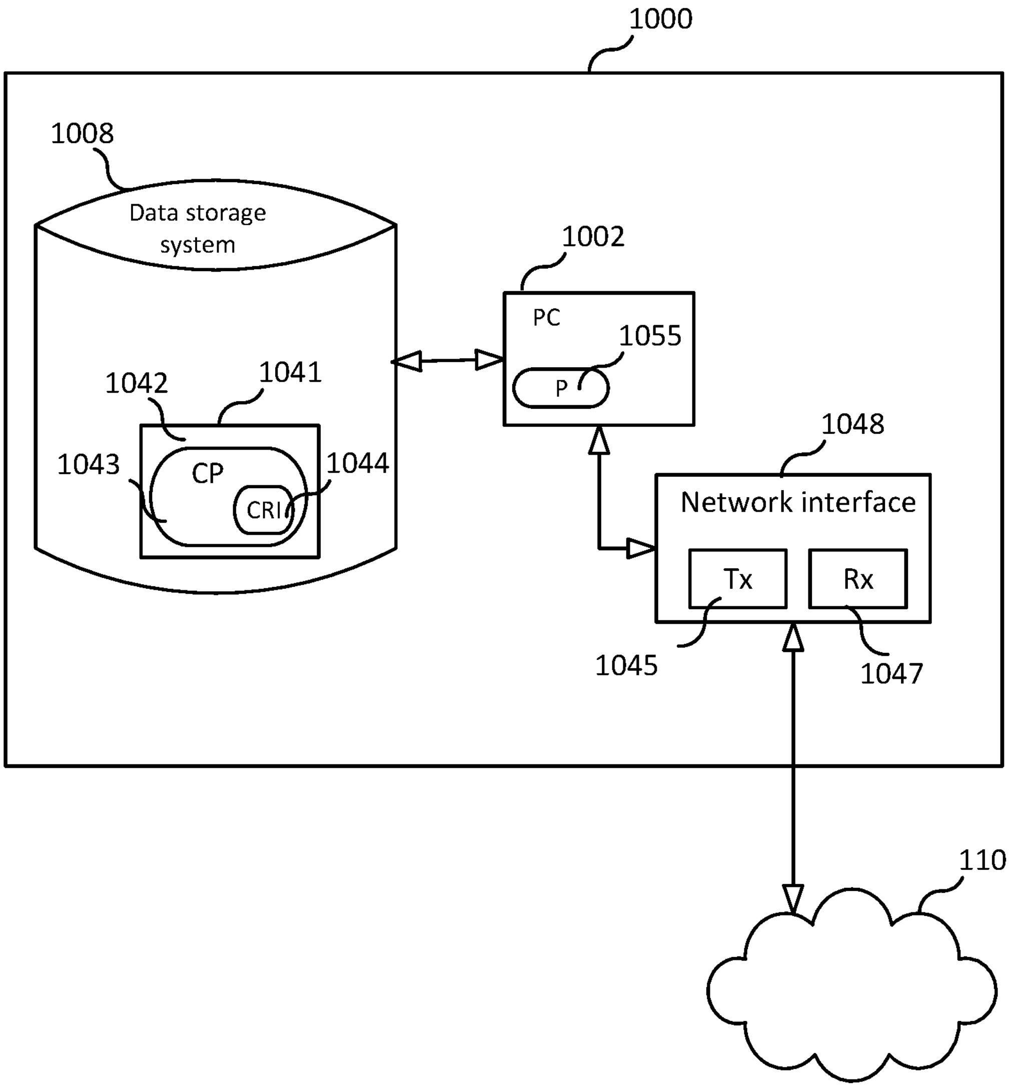
FIG. 10 shows an apparatus according to some embodiments.

FIG. 10 is a block diagram of an apparatus 1000, according to some embodiments, for performing the methods disclosed herein. Any of the encoder, the decoder, and the network node discussed above may be implemented using the apparatus 1000. As shown in FIG. 10, apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); at least one network interface 1048 comprising a transmitter (Tx) 1045 and a receiver (Rx) 1047 for enabling apparatus 1000 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes apparatus 1000 to perform steps described herein (e.g., steps described herein with reference to the flow charts). In other embodiments, apparatus 1000 may be configured to perform steps described herein without the need for code. That is, for example, PC 1002 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] ISO/IEC 23008-3:2019, "Information technology—High efficiency coding and media delivery in heterogeneous environments—Part 3: 3D audio".

[2] en.wikipedia.org/wiki/Cluster_analysis

[3] U.S. Pat. No. 9,961,475.

[4] S. Miyabe et al., 'TEMPORAL QUANTIZATION OF SPATIAL INFORMATION USING DIRECTIONAL CLUSTERING FOR MULTICHANNEL AUDIO CODING', 2009 IEEE Workshop on Applications of Signal Processing to Audio and Acoustics.

[5] US9805725, "OBJECT CLUSTERING FOR RENDERING OBJECT—BASED AUDIO CONTENT BASED ON PERCEPTUAL CRITERIA"

[6] International patent application no. PCT/EP2019/086876.

[7] International patent application no. PCT/EP2019/086877.

[8] M. Poletti, "Three-dimensional surround sound systems based on spherical harmonics", J. Audio. Eng. Soc. 53(11), 2005.

[9] J. Meyer & G. Elko, "A highly scalable spherical microphone array based on orthonormal decomposition of the sound field", Proc. IEEE Int-Conf. on Acoustics, Speech and Signal Processing, vol. 2., 2002.

[10] J. Daniel et al., "Further investigations of high order ambisonics and wavefield synthesis for holophonic sound imaging", AES Convention Paper 5788, 2003.

The invention claimed is:

1. A method for representing a cluster of audio objects, the method comprising:

obtaining reference position information identifying a position within the cluster of audio objects; and transforming the cluster of audio objects into a composite spatial audio object, wherein the transformation is performed with respect to the position within the cluster of audio objects identified by the reference position information, the transforming of the cluster of audio objects into the composite spatial audio object is performed independently of any listening position of any user, transforming the cluster of audio objects into the composite spatial audio object comprises spatially transforming the audio objects within the cluster of audio objects using a virtual microphone array located at the position within the cluster of audio objects identified by the reference position information, the virtual microphone array comprises a first virtual microphone and a second virtual microphone, and spatially transforming the audio objects within the cluster of audio objects using the virtual microphone array comprises:

determining a first virtual microphone position based on the reference position information;

determining a second virtual microphone position based on the reference position information;

positioning the first virtual microphone at the first virtual microphone position; and positioning the second virtual microphone at the second virtual microphone position.

2. The method of claim 1, wherein the composite spatial audio object represents the cluster of audio objects and preserves relative spatial positioning information of the audio objects included in the cluster of audio objects.

3. The method of claim 1, further comprising:

for each audio object included in the cluster of audio objects, obtaining audio object metadata for the audio object; and generating audio object metadata for the composite spatial audio object based on the obtained audio object metadata.

4. The method of claim 3, wherein the reference position information is obtained using the obtained audio object metadata for each audio object included in the cluster of audio objects.

5. The method of claim 3, wherein the metadata of the composite spatial audio object comprises position information identifying a position of the composite spatial audio object and/or spatial extent information identifying a spatial extent of the composite spatial audio object.

6. The method of claim 5, wherein the spatial extent of the composite spatial audio object comprises a dimension of the cluster of the audio objects and/or a distance between two outermost audio objects within the cluster of audio objects.

7. The method of claim 5, wherein the position of the composite spatial audio object is the position within the cluster of audio objects identified by the reference position information.

8. The method of claim 5, further comprising rendering the composite spatial audio object using the position information and/or the spatial extent information.

9. The method of claim 1, wherein the position within the cluster of audio objects identified by the reference position information is a geometric center of the cluster of audio objects.

10. The method of claim 1, further comprising:

identifying the cluster of audio objects from a set of M audio objects, where M is an integer greater than 1, wherein the cluster of audio objects consists of N audio objects, where N is an integer greater than 0 and less than or equal to M.

11. The method of claim 10, wherein identifying the cluster of audio objects is performed by a first device, transforming the cluster of audio objects into the composite spatial audio object is performed by a second device, and the method further comprises transmitting from the first device to the second device information for identifying the audio objects included in the cluster of audio objects.

12. The method of claim 11, wherein transmitting from the first device to the second device information for identifying the audio objects included in the cluster of audio objects comprises transmitting from the first device to the second device i) first audio object metadata for a first audio object included in the cluster of audio objects and ii) second audio object metadata for a second audio object included in the cluster of audio objects, wherein the first audio object metadata includes a cluster identifier that identifies the cluster of audio objects and the second audio object metadata includes the cluster identifier.

13. The method of claim 10, wherein identifying the cluster of audio objects from the set of M audio objects comprises determining a distance between a first audio object included in the set of M audio objects and a second audio object included in the set of M audio objects and including the first and second audio objects in the cluster of audio objects if the determined distance is less than a threshold distance.

14. The method of claim 10, wherein identifying the cluster of audio objects from the set of M audio objects is based on at least one of (1) information regarding computational resources available at a decoder or (2) scene change information.

15. The method of claim 1, wherein the cluster of audio objects consists of O audio objects, where O is an integer greater than 1, each of the O audio object is associated with a single audio signal, and the composite spatial audio object is associated with not more than P audio signals, where P is an integer greater than zero and less than O.

16. The method of claim 1, wherein the composite spatial audio object that results from the transformation of the audio objects in the cluster is a spherical harmonics representation of the cluster of audio objects with respect to the position within the cluster of audio objects identified by the reference position information.

17. The method of claim 1, wherein the composite spatial audio object is a multi-channel stereophonic representation of the cluster of audio objects.

18. The method of claim 1, further comprising rendering the composite spatial audio object using position information identifying a position of the composite spatial audio object and/or spatial extent information identifying a spatial extent of the composite spatial audio object.

19. The method of claim 1, wherein spatially transforming the audio objects within the cluster of audio objects using the virtual microphone array further comprises:

using the first and second virtual microphones to produce a plurality of downmix signals in orthogonal directions.

20. A non-transitory computer readable storage medium storing a computer program comprising instructions which when executed by processing circuitry of an apparatus causes the apparatus to perform the method of claim 1.

21. An apparatus for representing a cluster of audio objects, the apparatus comprising:

a computer readable storage medium; and processing circuitry coupled to the computer readable storage medium, wherein the processing circuitry is configured to cause the apparatus to:

obtain reference position information identifying a position within the cluster of audio objects; and transform the cluster of audio objects into a composite spatial audio object, wherein the transformation is performed with respect to the position within the cluster of audio objects identified by the reference position information, the transforming of the cluster of audio objects into the composite spatial audio object is performed independently of any listening position of any user, and transforming the cluster of audio objects into the composite spatial audio object comprises spatially transforming the audio objects within the cluster of audio objects using a virtual microphone array located at the position within the cluster of audio objects identified by the reference position information the virtual microphone array comprises a first virtual microphone and a second virtual microphone, and spatially transforming the audio objects within the cluster of audio objects using the virtual microphone array comprises:

determining a first virtual microphone position based on the reference position information;

determining a second virtual microphone position based on the reference position information;

positioning the first virtual microphone at the first virtual microphone position; and positioning the second virtual microphone at the second virtual microphone position.

* * * * *